United States Patent
Tobergte (10) Patent No.: US 8,065,531 B2
(45) Date of Patent: Nov. 22, 2011

(54) DECRYPTION METHOD

(75) Inventor: Wolfgang Tobergte, Halstenbek (DE)

(73) Assignee: NXP B.V., Eindhoven (NL)

( * ) Notice: Subject to any disclaimer, the term of this patent is extended or adjusted under 35 U.S.C. 154(b) by 472 days.

(21) Appl. No.: 12/295,995

(22) PCT Filed: Feb. 15, 2007

(86) PCT No.: PCT/IB2007/050493
§ 371 (c)(1),
(2), (4) Date: Oct. 3, 2008

(87) PCT Pub. No.: WO2007/113697
PCT Pub. Date: Oct. 11, 2007

(65) Prior Publication Data
US 2009/0180610 A1    Jul. 16, 2009

(30) Foreign Application Priority Data

Apr. 6, 2006 (EP) .................................. 06112279

(51) Int. Cl.
*G06F 11/30* (2006.01)
*G06F 12/14* (2006.01)
*G06F 13/00* (2006.01)

(52) U.S. Cl. ........................................ 713/187; 708/164

(58) Field of Classification Search .................. 713/187; 708/164
See application file for complete search history.

(56) References Cited

U.S. PATENT DOCUMENTS

| | | | |
|---|---|---|---|
| 6,212,277 B1 * | 4/2001 | Miyaji | 380/30 |
| 6,298,135 B1 * | 10/2001 | Messerges et al. | 380/1 |
| 6,738,478 B1 * | 5/2004 | Vanstone et al. | 380/28 |
| 6,832,316 B1 * | 12/2004 | Sibert | 713/181 |
| 7,359,508 B2 * | 4/2008 | Villegas et al. | 380/30 |
| 7,404,089 B1 * | 7/2008 | Campagna et al. | 713/194 |
| 7,826,610 B2 * | 11/2010 | Akkar et al. | 380/28 |
| 7,940,928 B2 * | 5/2011 | Sibert | 380/28 |
| 2001/0033655 A1 * | 10/2001 | Vadekar et al. | 380/28 |
| 2002/0061104 A1 | 5/2002 | Knudsen | |
| 2003/0128842 A1 * | 7/2003 | Nakano et al. | 380/30 |
| 2005/0060560 A1 * | 3/2005 | Sibert | 713/193 |
| 2005/0108555 A1 * | 5/2005 | Sibert | 713/187 |
| 2005/0163312 A1 * | 7/2005 | Joye et al. | 380/28 |
| 2007/0177721 A1 * | 8/2007 | Itoh et al. | 380/28 |
| 2008/0205639 A1 * | 8/2008 | Braun et al. | 380/30 |
| 2009/0052657 A1 * | 2/2009 | Golic | 380/28 |

(Continued)

FOREIGN PATENT DOCUMENTS

EP            1443393 A       8/2004
(Continued)

OTHER PUBLICATIONS

Benoit Chevallier-Mames. Self-Randomized Exponentiation Algorithms. 2004. Springer-Verlag. p. 236-249.*

(Continued)

*Primary Examiner* — Christian Laforgia (57) ABSTRACT

The invention relates to a method of determining a plaintext M on the basis of a cipher C and using a secret key d, wherein the secret key d is used in binary form, wherein the plaintext M is determined in each iteration step i for the corresponding bit $d_i$ and a security variable $M_n$ is determined in parallel therewith, and then a verification variable x is determined by means of a bit-compatible exponent of the secret key d.

20 Claims, 6 Drawing Sheets

U.S. PATENT DOCUMENTS

2010/0077225 A1* 3/2010 Salgado et al. ............... 713/189

FOREIGN PATENT DOCUMENTS

| WO | WO 2007/028669 A1 | * | 3/2007 |
| WO | WO 2007/048430 A1 | * | 5/2007 |
| WO | WO 2008/044113 A2 | * | 4/2008 |

OTHER PUBLICATIONS

Hideyo Mamiya et al. Efficient Countermeasures Against RPA, DPA, and SPA. 2004. CHES 2004, LNCS 3156. p. 343-356.*

Fauzan Mizra. Block Ciphers and Cryptanalysis. 1998. p. 1-27.*

Oswald E et al; "Randomized Addition-Subtraction Chains as a Countermeasure Against Power Attacks". Cryptographic Hardware and Embedded Systems. 3rd International Workshop, CHES 2001, Paris, France. May 14-16, 2001. Proceedings, Lecture Notes in Computer Science, Berlin: Springer, DE. vol. 2162, pp. 39-50.

Changkyun Kim et al; "A Secure and Practical CRT-Based RSA to Resist Side Channel Attacks". International Conference, Assisi, Italy, May 14-17, 2004. Proceedings, Part I. Computational Science and Its Applications – ICCSA 2004 Lecture Notes in Computer Science. vol. 3043, pp. 150-158.

Guillaume Fumaroli et al; "Blinded Fault Resistant Exponentiation". Third International Workshop, FDTC 2006. Proceedings: Fault Diagnosis and Tolerance in Cryptography Lecture Notes in Computer Science; LNCS. vol. 4236, Oct. 10, 2006, pp. 62-70.

* cited by examiner

DECRYPTION METHOD

FIELD OF THE INVENTION

The invention relates to a method for determining a plaintext on the basis of a cipher.

BACKGROUND OF THE INVENTION

Such methods are known for example by the RSA method. In the RSA method, a plaintext is encrypted by means of a public key, wherein this cipher can be decrypted again by means of an associated secret key. Since the encrypted data are usually highly confidential and nevertheless are publicly accessible, the data are more and more frequently being exposed to attacks in order to spy out the secret key so that the encrypted data can be decrypted and thus undesirably determined in order to misuse the decrypted data.

Such attacks have become known as timing attacks or differential fault analysis (DFA) attacks, in which the computation time or running time of a calculation or a fault behavior during manipulations is observed in order to determine the secret key that is used during such processes.

Therefore, methods have been created which, using considerable computational effort through an inverse RSA function or a second RSA calculation, attempt to ascertain such manipulations and make them ineffective.

OBJECT AND SUMMARY OF THE INVENTION

The object of the invention is to provide a method for determining a plaintext on the basis of a cipher, which is not susceptible to timing attacks and differential fault analysis attacks and nevertheless is associated with a relatively low amount of additional effort.

This is achieved according to the invention by a method of determining a plaintext M on the basis of a cipher C and using a secret key d, wherein the secret key d is used in binary form, wherein the plaintext M is determined in each iteration step i for the corresponding bit $d_i$ of the secret key and a security variable $M_n$ is determined in parallel therewith, and then a verification variable x is determined by means of a bit-compatible exponent of the secret key d.

Advantageous further developments are described in the dependent claims.

BRIEF DESCRIPTION OF THE DRAWINGS

The invention will be further described with reference to an example of embodiment shown in the drawings to which, however, the invention is not restricted.

DESCRIPTION OF EMBODIMENTS

Figure 1:
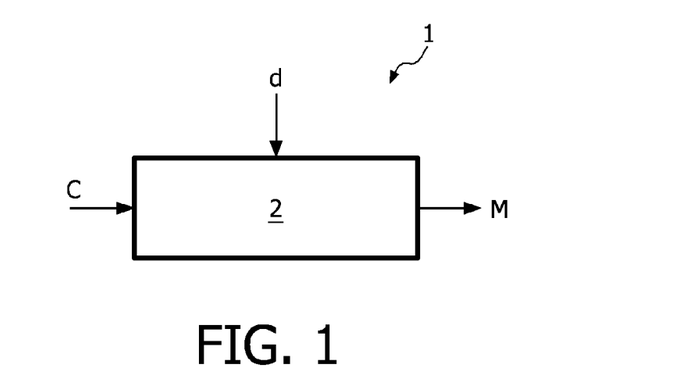
FIG. 1 shows a schematic illustration of the RSA method.

Encryption and decryption methods are very widespread today, since confidential information is used very frequently and is also transmitted in a publicly accessible manner. An implementation of such an encryption and the associated decryption according to the prior art will be described below with reference to the so-called RSA method according to Rivest, Shamir and Adleman. In the RSA method, firstly a plaintext M is encrypted using a public key g to form a cipher C, that is to say a secret text. This encrypted cipher C can then also be made public or transmitted, since the cipher C cannot be decrypted without the secret key d. The calculation of the plaintext M is carried out by a modular exponentiation (mod N) of the cipher C using the secret key d. FIG. 1 shows a schematic diagram 1 in order to illustrate the decryption according to the RSA method of $M=C^d \bmod N$. For this, FIG. 1 shows a block 2 which represents the RSA decryption. The input variables used are the cipher C and the secret key d, so that the plaintext M is obtained as the result.

The implementation of this equation generally takes place by means of the so-called "multiplication and squaring" algorithm. Here, the key d is used in its binary form with the length L:

$$d = d_0 + 2d_1 + 4d_2 + \ldots 2^{L-1}d_{L-1}$$
$$= \sum_{i=0}^{L-1} 2^i \cdot d_i$$
$$d_i \in \{0, 1\}$$

If this form is used, the result is a product chain as follows:

$$M = C^{d_0} \cdot C^{2d_1} \cdot C^{4d_1} \cdot C^{8d_1} \ldots \cdot C^{2^{L-1}d_{L-1}} \bmod N$$
$$M = \prod_{i=0}^{L-1} C^{2^i d_i} \bmod N$$

If $x_i = C^{2^i}$, then in $$M = \prod_{i=0}^{L-1} x_i^{d_i} \bmod N$$

where $x_i^{d_i} = \begin{cases} x_i & \text{for } d_i = 1 \\ 1 & \text{for } d_i = 0 \end{cases}$ the variable $x_i$ can be calculated iteratively:

$$x_{i+1} = C^{2^{i+1}} = (C^{2^i})^2 = x_i^2$$

The "multiplication and squaring" algorithm is thus obtained as a pseudo-code:

```
M=1;x=C;
for i= 0 to L-1
    if d == 1
        M = M * x mod N
    end if
    x=square(x) mod N
endfor
```

Figure 2:
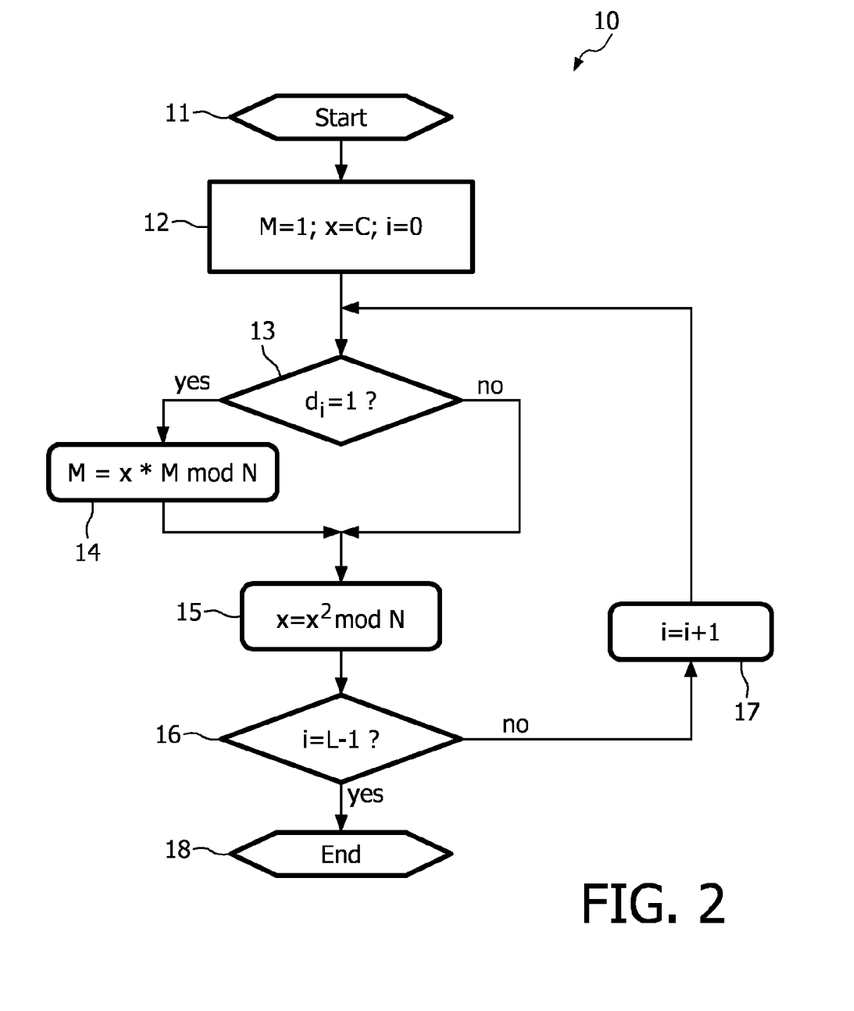
FIG. 2 shows a block diagram of the RSA method.

FIG. 2 shows the associated procedure 10 of modular exponentiation as a block diagram.

The method starts in block 11, and in block 12 the method is initialized with the values M=1, x=C and i=0. In block 13 an interrogation takes place as to whether the bit $d_i$ of the secret key d is equal to 1. If this is the case, the method continues with block 14; if not, the method continues with block 15. In block 14, $M=x*M \bmod N$ is calculated. The method then also continues with block 15, wherein $x=x^2 \bmod N$ is determined. Thereafter, in block 16, an interrogation takes place as to whether $i=L-1$. If this is the case, the method is terminated in block 18; if not, $i=i+1$ is set in block 17 and the method continues again with block 13. L cycles are carried out, in which in each case one bit $d_i$ of the secret key d is processed.

Timing attacks on the RSA method were introduced in 1998. In these attacks, the secret key d is derived from the different running time or computing time in the respective cycles. If $d_i=1$, the multiplication in block 14 is carried out, i.e. there is a long running time. If $d_i=0$, the multiplication in block 14 is not carried out and the result is therefore a short running time. Detection of the running time or of the computing times for each cycle takes place for example by evaluating the current consumption, by recording the cache activity in PC applications or by measuring the electromagnetic radiation of components.

Figure 3:
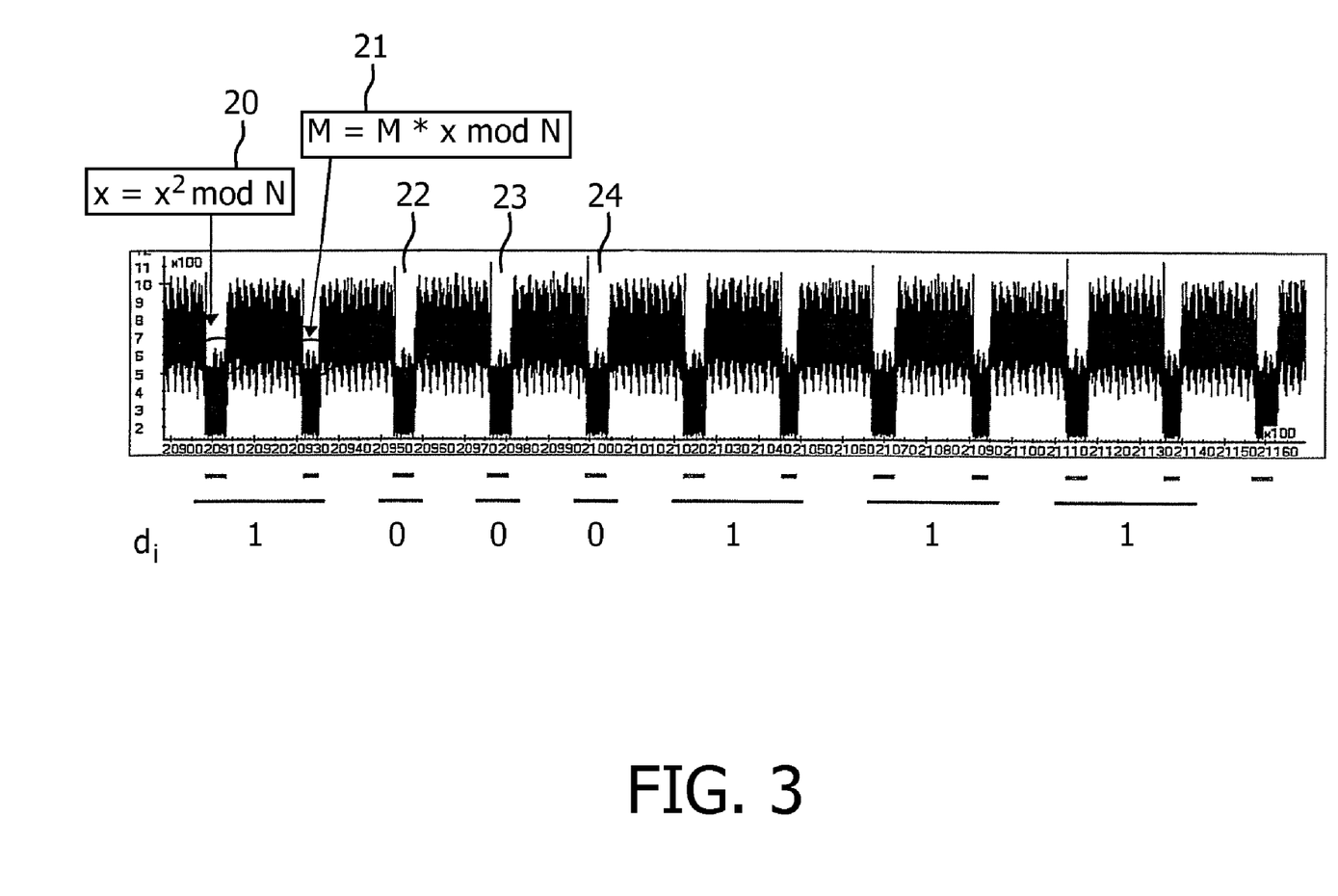
FIG. 3 shows an illustration of a timing attack.

Such a current consumption of a chip card microcontroller as a function of time is shown by way of example in FIG. 3 and illustrates the mode of operation of these timing attacks in a simple manner. FIG. 3 shows regions of different current consumption as a function of time, wherein the regions of low current consumption have two typical widths, i.e. durations. The first region 20 represents a region of squaring, in which $x=x^2 \bmod N$ is determined, while the region 21 represents a region of multiplication, in which $M=x*M \bmod N$ is calculated. Since the last calculation according to the method of FIG. 2 is carried out only if the bit $d_i=1$, then for the present case $d_i$ must be equal to 1. This is then followed by regions 22, 23 and 24, in which the multiplication is not carried out and thus $d_i$ must be equal to 0. It is thus possible to detect in a relatively simple manner whether $d_i=0$ or $d_i=1$. The corresponding value of $d_i$ is shown in the bottom line of FIG. 3. It is thus possible to detect the respective key bit $d_i$ based on the current curve by means of the different running times for "multiplication" and "squaring". In order to prevent these attacks, use is made of the so-called "always multiplication and squaring" method which, for the case where $d_i=0$, always carries out an identical but ineffective multiplication which leads to a constant cycle time for $d_i=1$ or $d_i=0$. The associated pseudo-code is accordingly:

```
M=1;x=C;
for i= 0 to L-1
    if d == 1
        M = M * x mod N
    else
        M * x mod N
    end if
    x=square(x) mod N
endfor
```

Figure 4:
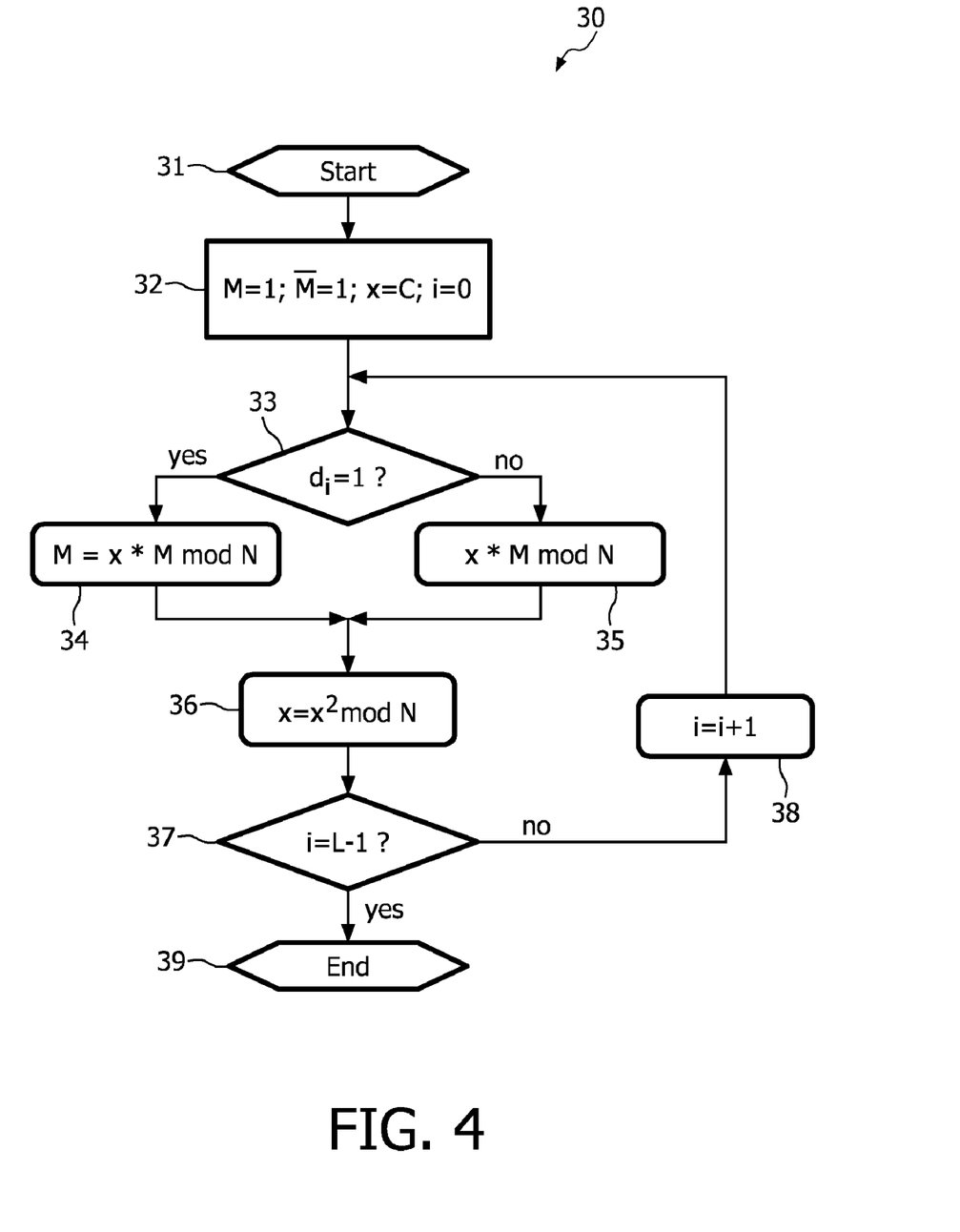
FIG. 4 shows a block diagram of the "always multiplication and squaring" method.

FIG. 4 shows a block diagram 30 for illustrating this improved RSA method. The method starts in block 31, and in block 32 the method is initialized with corresponding start values. In block 33 an interrogation takes place as to whether $d_i=1$. If this is the case, the method continues with block 34; if not, the method continues with block 35. In block 34, $M=x*M \bmod N$ is calculated. In block 35, $x*M \bmod N$ is carried out as a so-called ineffective multiplication. The method then continues with block 36, in which $x=x^2 \bmod N$ is determined. Thereafter, in block 37, an interrogation takes place as to whether $i=L-1$. If this is the case, the method is terminated in block 39; if not, $i=i+1$ is set in block 38 and the method continues again with block 33. L cycles are again carried out, in which in each case one bit $d_i$ of the secret key d is processed.

Following the implementation of the improved RSA method, another method of attack, the so-called differential fault analysis (DFA) attack, on this algorithm became known, according to which the multiplication in the individual cycles is disrupted for example by physical influences such as light, electromagnetic pulses, power supply pulses or the like. If a disruption of the multiplication does not have any effect on the end result, the associated cycle carries out an ineffective multiplication as described above. The corresponding key bit $d_i$ is then $d_i=0$. However, if the disruption alters the end result, the key bit is thus $d_i=1$. If the method is attacked in this way on a cycle-by-cycle basis, the entire secret key d can be determined.

In order to prevent such an attack, the calculation of the cipher is usually verified by the inverse RSA function using the public key e through $C=M^e$ or by a second RSA calculation. In the first case, the public key e must be known in the system. In the second case, the time taken for the calculation is doubled.

The method according to the invention for protection against the above-described DFA attacks provides for verification of the calculation of the exponential equation $M=C^d$ by means of a checksum. In this case, a method is carried out which makes use of the ineffective multiplication shown in the method of FIG. 4. To this end, the cipher $M_n$ of the binary complementary exponent of d is calculated during the ineffective multiplication, see FIG. 5. The method according to the invention as shown in FIG. 5 provides for verification of the "always multiplication and squaring" method by calculating $M_n$.

Figure 5:
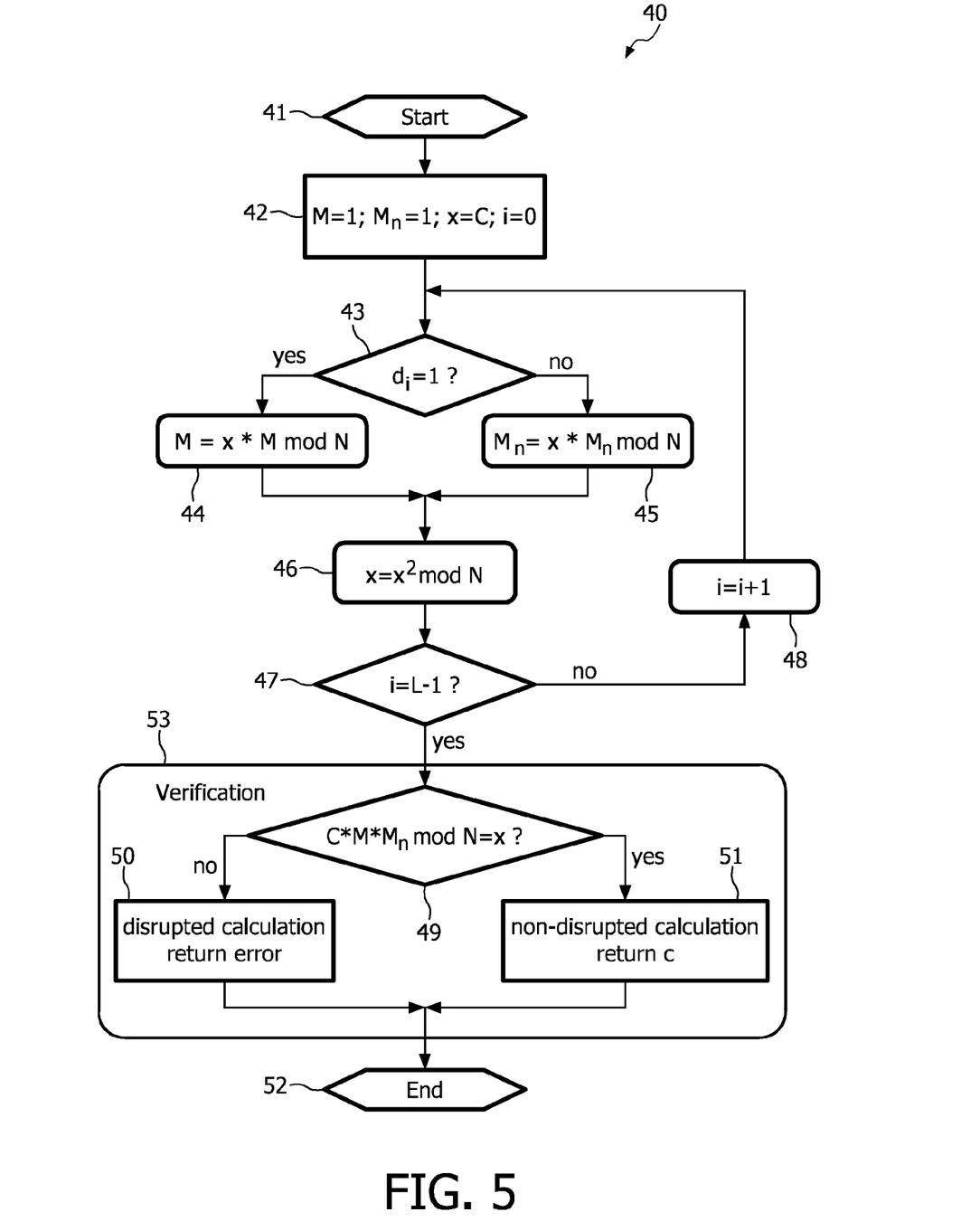
FIG. 5 shows a block diagram of the verification method according to the invention.

FIG. 5 shows a block diagram 40 for illustrating this method which has been improved with regard to DFA attacks. The method starts in block 41, and in block 42 the method is initialized with start values. In block 43 an interrogation takes place as to whether $d_i=1$. If this is the case, the method continues with block 44; if not, the method continues with block 45. In block 44, $M=x*M \bmod N$ is calculated. In block 45, $M_n=x*M \bmod N$ is calculated. The method then also continues with block 46, in which $x=x^2 \bmod N$ is determined. Thereafter, in block 47, an interrogation takes place as to whether $i=L-1$. If this is the case, the method is terminated in block 49; if not, $i=i+1$ is set in block 48 and the method continues again with block 43. In block 49, the calculation $C*M*M_n \bmod N=x$ is queried as part of the verification block 53. If the equation is satisfied, a non-disrupted calculation is recognized in block 51 and a corresponding signal is returned. However, if the equation is not satisfied, a disrupted calculation is recognized in block 50 and a corresponding error signal is returned. The method is terminated in block 52. L cycles are again carried out, in which in each case one bit $d_i$ of the secret key d is processed.

If, according to FIG. 5, the calculation $M_n=x*M_n \bmod N$ is carried out during the ineffective multiplication, the following is obtained at the end of the last cycle:

$$M_n = C^{\bar{d}} \bmod N$$

wherein the complement $\bar{d}$ of the key d has to be replaced by the equation $$\bar{d} = 2^L - 1 - d.$$

This gives:

$$M_n = C^{2^L - 1 - d} \bmod N.$$

If the product $$y = C \cdot M \cdot M_n \bmod N$$

$$y = C \cdot C^d \cdot C^{2^L - 1 - d} \bmod N$$

$$y = C^{2^L} \bmod N$$

is calculated, the result y can be compared directly with the auxiliary variable x, which after L cycles assumes the same value $x_L = C^{2^L} \bmod N$. Any disruption due to a so-called DFA attack thus means that x is not equal to the product y.

With just two multiplications and one comparison with a typical 1024-bit RSA (1024 multiplications+ 1024 squaring calculations), the effort for this verification is low.

The calculation is even more advantageous if $M_n$ is initialized with C. There is thus no need for the multiplication by C after the last cycle. Moreover, the memory requirement is reduced since there is no need to store C after the initialization. Such a method is shown in FIG. 6, wherein optimization is carried out by initializing $M_n = C$ prior to the exponentiation.

Figure 6:
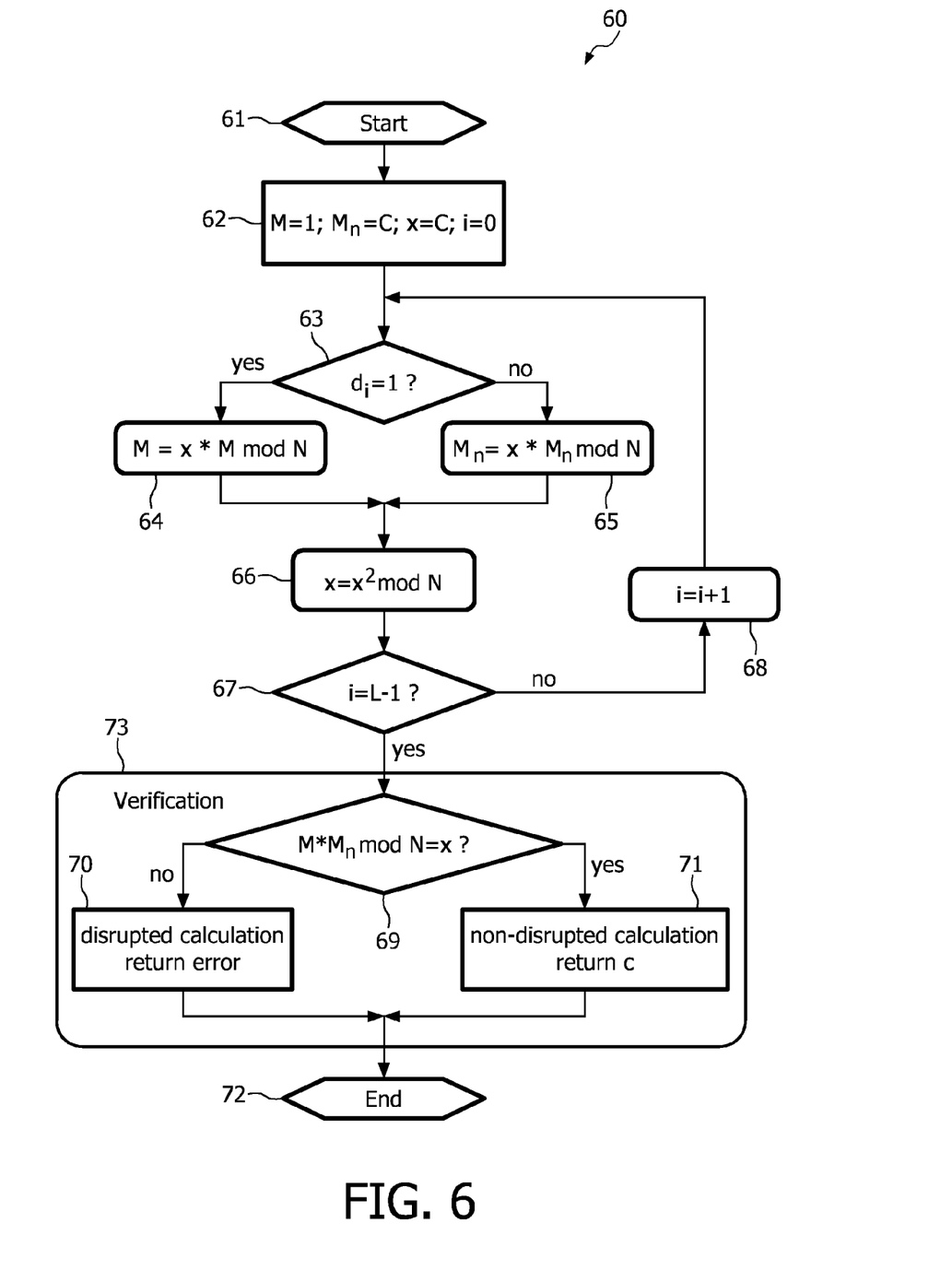
FIG. 6 shows a block diagram of the verification method according to the invention.

FIG. 6 shows a block diagram 60 for illustrating this method which has been improved with regard to DFA attacks and optimized. The method starts in block 61, and in block 62 the method is initialized with start values including $M_n = C$. In block 63 an interrogation takes place as to whether $d_i = 1$. If this is the case, the method continues with block 64; if not, the method continues with block 65. In block 64, M=x*M mod N is calculated. In block 65, $M_n = x*M_n$ mod N is calculated. The method then also continues with block 66, in which $x = x^2$ mod N is determined. Thereafter, in block 67, an interrogation takes place as to whether i=L−1. If this is the case, the method is terminated in block 69; if not, i=i+1 is set in block 68 and the method continues again with block 63. In block 69, the calculation $M*M_n$ mod N=x is queried as part of the verification block 73. If the equation is satisfied, a non-disrupted calculation is recognized in block 71 and a corresponding signal is returned. However, if the equation is not satisfied, a disrupted calculation is recognized in block 70 and a corresponding error signal is returned. The method is terminated in block 72.

Figure 7:
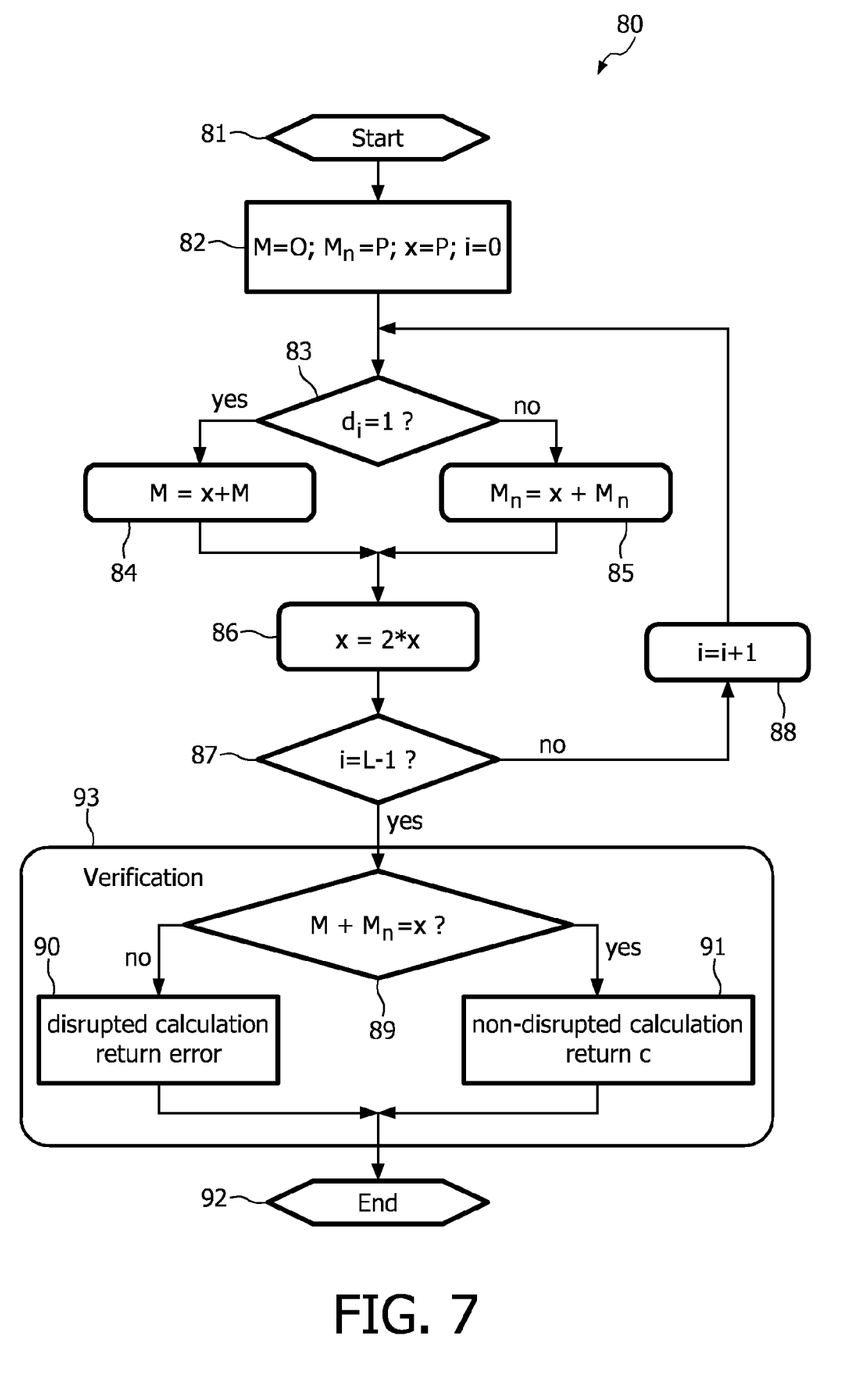
FIG. 7 shows block diagram of the verification method according to the invention.

However, according to the invention, the above-described method can also be applied to other methods or to general mathematical structures, such as to processes of the "always addition and doubling" method. FIG. 7 shows a block diagram 80 for illustrating a corresponding "always addition and doubling" method which has been improved with regard to DFA attacks and optimized, such as an ECC or HECC method, wherein the ECC method is the method of elliptical curve cryptography and the HECC method is the method of hyperelliptical curve cryptography. The method starts in block 81, and in block 82 the method is initialized with start values. In block 83 an interrogation takes place as to whether $d_i = 1$. If this is the case, the method continues with block 84; if not, the method continues with block 85. In block 84, M=x+M is calculated. In block 85, $M_n = x + M_n$ is calculated. The method then also continues with block 86, in which x=2*x is determined. Thereafter, in block 87, an interrogation takes place as to whether i=L−1. If this is the case, the method continues in block 89; if not, i=i+1 is set in block 88 and the method continues again with block 83. In block 89, the calculation $M + M_n = x$ is queried as part of the verification block 93. If the equation is satisfied, a non-disrupted calculation is recognized in block 91 and a corresponding signal is returned. However, if the equation is not satisfied, a disrupted calculation is recognized in block 90 and a corresponding error signal is returned. The method is terminated in block 92.

This verification method can also be used for general mathematical groups. Let (G,+,O) be a group containing elements of G, a neutral element O and a group linker "+". The n-fold summing of a group element P is denoted n*P, in particular 0*P=O and (−n)*P=n*(−P), wherein "−P" is the inverse element of P. In order to protect the implementation of the operation d*P using an optionally also secret scalar factor d≧0 with a bit length L against timing attacks, an "always addition and doubling" algorithm can also be implemented in the same way as the "always multiplication and squaring" algorithm. The above-described protection against DFA attacks can also be transferred in an analogous manner; the auxiliary variable y is calculated at the end:

$$y = M + M_n = (d*P) + ((2^L - 1 - d)*P) + P$$

$$y = 2^L * P$$

A DFA attack has then taken place when, and only when, for the auxiliary variable x, x≠y.

LIST OF REFERENCES 1 diagram
2 block of diagram 1
10 block diagram showing the procedure of modular exponentiation
11 block of block diagram 10
12 block of block diagram 10
13 block of block diagram 10
14 block of block diagram 10
15 block of block diagram 10
16 block of block diagram 10
17 block of block diagram 10
18 block of block diagram 10
20 region
21 region
22 region
23 region
24 region
30 block diagram
31 block of block diagram 30
32 block of block diagram 30
33 block of block diagram 30
34 block of block diagram 30
35 block of block diagram 30
36 block of block diagram 30
37 block of block diagram 30
38 block of block diagram 30
40 block diagram
41 block of block diagram 40
42 block of block diagram 40
43 block of block diagram 40
44 block of block diagram 40
45 block of block diagram 40
46 block of block diagram 40
47 block of block diagram 40
48 block of block diagram 40
49 block of block diagram 40
50 block of block diagram 40
51 block of block diagram 40
52 block of block diagram 40
53 verification block of block diagram 40
60 block diagram
61 block of block diagram 60
62 block of block diagram 60
63 block of block diagram 60
64 block of block diagram 60

65 block of block diagram 60
66 block of block diagram 60
67 block of block diagram 60
68 block of block diagram 60
69 block of block diagram 60
70 block of block diagram 60
71 block of block diagram 60
72 block of block diagram 60
73 verification block of block diagram 60
80 block diagram
81 block of block diagram 80
82 block of block diagram 80
83 block of block diagram 80
84 block of block diagram 80
85 block of block diagram 80
86 block of block diagram 80
87 block of block diagram 80
88 block of block diagram 80
89 block of block diagram 80
90 block of block diagram 80
91 block of block diagram 80
92 block of block diagram 80
93 verification block of block diagram 80

The invention claimed is:

1. A method of determining a plaintext M based upon a cipher C in a chip card microcontroller and using a secret key d, wherein the secret key d is used in binary form containing bits $d_i$, the method comprising:
   initializing a plaintext variable M, a second variable $M_n$, and a third variable x, whereby x is initialized to the cipher C iteratively, for each bit $d_i$ of the secret key d depending on the value of the corresponding bit $d_i$:
   determining whether $d_i$ is equal to 1:
   if $d_i$ is equal to 1, then calculating a new value of M from x and a previous value of M;
   if $d_i$ is not equal to 1, then calculating a new value of $M_n$ from x and a previous value of $M_n$;
   calculating a new value for x such that a final value of M is the plaintext M;
   comparing x to a value depending on final values of both M and $M_n$; and
   verifying, after a last iteration, whether calculation of the plaintext M was disrupted.

2. The method as claimed in claim 1, further comprising:
   determining the plaintext M by means of exponentiation (mod N).

3. The method as claimed in claim 1, further comprising:
   using a multiplication/squaring algorithm to determine the plaintext M.

4. The method as in claim 1, further comprising:
   using an addition/doubling algorithm to determine the plaintext M.

5. The method as claimed in claim 1, further comprising:
   calculating M=x*M mod N for $d_i$=1 to determine the plaintext M.

6. The method as claimed in claim 5, further comprising:
   calculating $M_n=M_n$*x mod N for $d_i$=0 to detect ineffective multiplication.

7. The method as in claim 1, further comprising:
   calculating M=x+M for $d_i$=1 to determine the plaintext M.

8. The method as claimed in claim 5,
   calculating $M_n$=x+$M_n$ for $d_i$=0 to detect ineffective addition.

9. The method as in claim 1, further comprising:
   calculating M*$M_n$ mod N=x for verification purposes.

10. The method as in claim 1, further comprising:
    calculating M+$M_n$=x for verification purposes.

11. The method of claim 1, further comprising:
    using a checksum to verify calculation of M=$C_d$.

12. The method of claim 1, further comprising:
    calculating the new value of $M_n$ during ineffective multiplication.

13. The method of claim 1, further comprising:
    determining x=$x^2$ mod N.

14. The method of claim 1, further comprising:
    calculating whether M*$M_n$ mod N is equal to x.

15. The method of claim 14, further comprising:
    when M*$M_n$ mod N is equal to x, recognizing a non-disrupted calculation and returning a corresponding signal.

16. The method of claim 14, further comprising:
    when M*$M_n$ mod N is not equal to x, recognizing a disrupted calculation and returning an error signal.

17. The method of claim 1, further comprising:
    initializing $M_n$ with C.

18. The method of claim 1, further comprising:
    calculating whether M+$M_n$ is equal to x.

19. The method of claim 18, further comprising:
    when M+$M_n$ is equal to x, recognizing a non-disrupted calculation and returning a corresponding signal.

20. The method of claim 18, further comprising:
    when M+$M_n$ is not equal to x, recognizing a disrupted calculation and returning an error signal.

* * * * *